Figure 1:
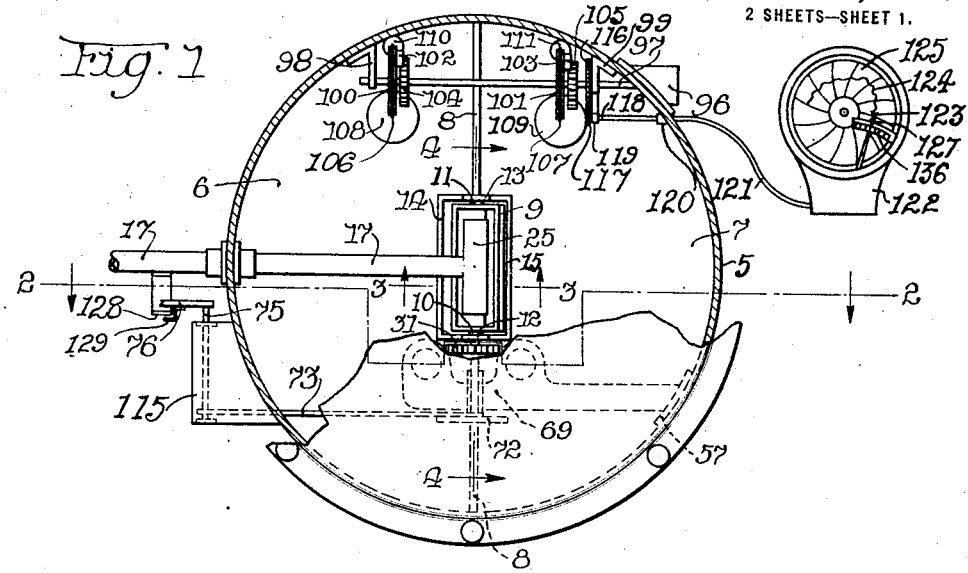

H. C. ALGER.
LIQUID METER.
APPLICATION FILED OCT. 15, 1917.

1,393,931. Patented Oct. 18, 1921.

2 SHEETS—SHEET 1.

Inventor
Harley C. Alger

H. C. ALGER.
LIQUID METER.
APPLICATION FILED OCT. 15, 1917.

1,393,931.

Patented Oct. 18, 1921.
2 SHEETS—SHEET 2.

Inventor
Harley C. Alger

UNITED STATES PATENT OFFICE.

HARLEY C. ALGER, OF OAK PARK, ILLINOIS.

LIQUID-METER.

1,393,931.  Specification of Letters Patent.  Patented Oct. 18, 1921.

Application filed October 15, 1917. Serial No. 196,657.

*To all whom it may concern:*

Be it known that I, HARLEY C. ALGER, a citizen of the United States, residing at Oak Park, in the county of Cook and State of Illinois, have invented a new and useful Liquid-Meter, of which the following is a specification.

My invention relates to improvements in meters of the type wherein the liquid to be measured passes into a measuring compartment where it is in communication with air or other fluid with which the liquid does not readily mix and more particularly to meters of this type which measure or weigh the liquid in unit charges which are separated from one another for the purpose of measurement. One object of my invention is the construction of a meter which will be efficient and accurate at various rates of flow; another object is, the construction of a meter of the type mentioned which will be capable of indicating the rate of flow by means of a suitable scale or recording chart and also capable of indicating the total amount of liquid which has passed through the meter by means of suitable registering mechanism; another object is the construction of a meter of this type which may be used to deliver liquid to a pump in a substantially uninterrupted stream without the use of an intervening storage tank; another object is the construction of a meter of the type mentioned which will reduce the vertical distance through which the liquid being measured passes, thereby increasing the head of the liquid delivered by the meter; while a further object is to provide a meter which may be used under pressure or vacuum.

In many cases it has been found that the most accurate results in the measuring water or other liquid can only be obtained by delivering the liquid to a suitable measuring tank or weighing compartment where the liquid may be positively measured either automatically or by hand by obtaining its volume or weight and then delivering the measured liquid in charges to a storage-chamber where a supply of measured liquid is maintained for the purpose desired. For example, in measuring boiler feed water, a measuring device which measures or weighs the water in unit charges in communication with the atmosphere is often used. The meter usually receives its supply from a feed water heater, measures it and delivers it to a storage tank placed at a lower level than the meter. A boiler feed pump connected with the storage tank then takes the water from the storage tank and forces it through suitable piping to the boiler. Where the measuring is done automatically it is customary to install a control valve in the line supplying water to the meter. The control valve usually has an operating lever connected with a float actuated by the level of water in the storage tank. As the level of water in the storage tank falls, the float opens the control valve increasing the rate of flow to the meter and storage tank and vice versa, so that a supply of measured water is automatically maintained in the storage tank.

Such an arrangement, however, has several disadvantages: the storage tank occupies considerable space, it radiates heat, cooling the boiler feed water where hot water is being measured, it adds to the expense of the installation while the vertical distance through which the water passes while being measured and delivered to the storage tank reduces the head of water available for the boiler feed pump which is often a serious disadvantage. Further, while meters that deliver water or other liquid in charges have been made which indicate the total amount of liquid which has passed through the meter, they have not heretofore been constructed so as to truly indicate the rate of flow upon a suitable scale or upon a recording chart which in many cases is desirable.

In my invention it will be seen that a meter has been provided which retains the advantages of positively measuring the liquid in unit charges while at the same time it eliminates the storage tank with its attendant disadvantages. It will also be seen that this meter may be used under pressure or vacuum thus transmitting the static pressure of the liquid through the meter and that it is constructed so as to permit the use of mechanism for indicating the rate of flow either upon a scale or recording chart as well as the use of a register which registers the total amount of liquid which has passed through the meter.

Figure 2:
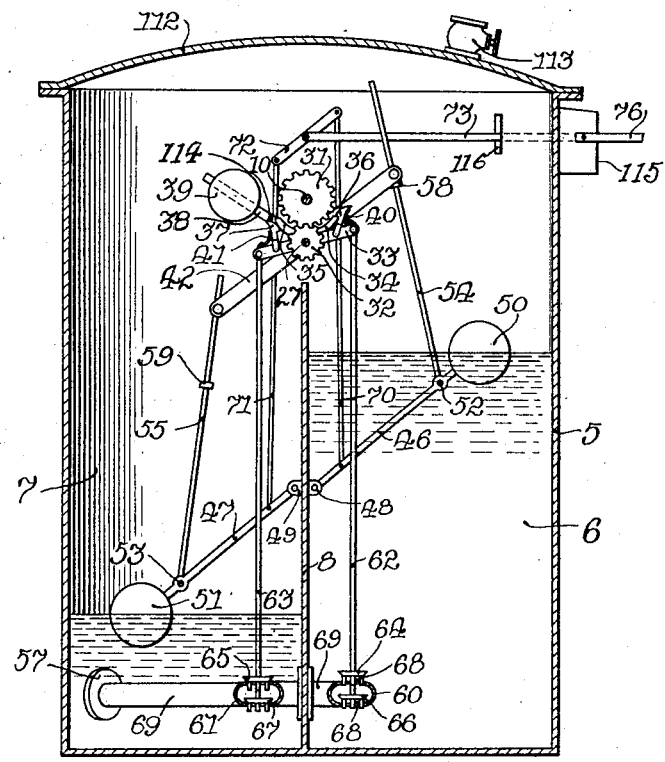
Figure 3:
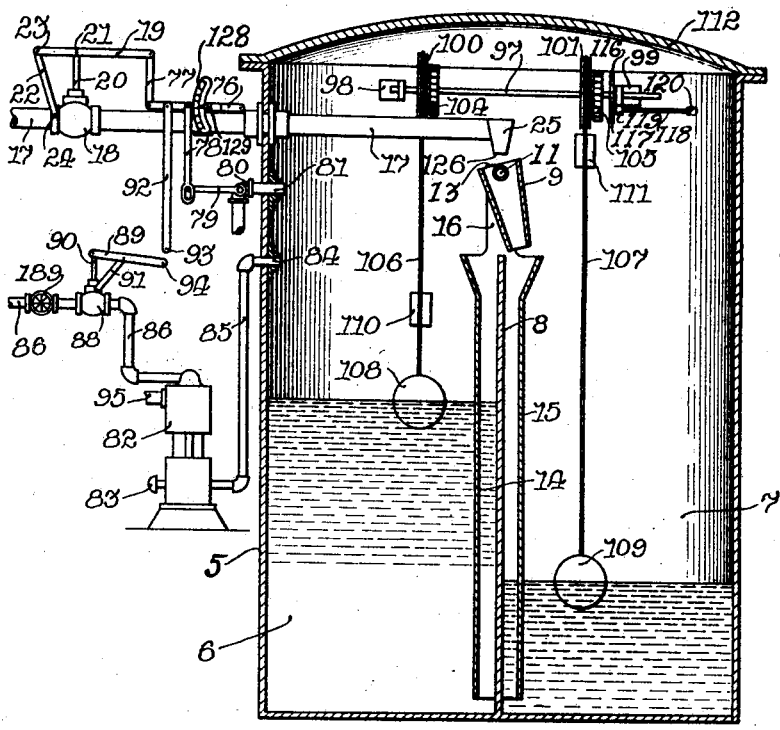
Figure 4:
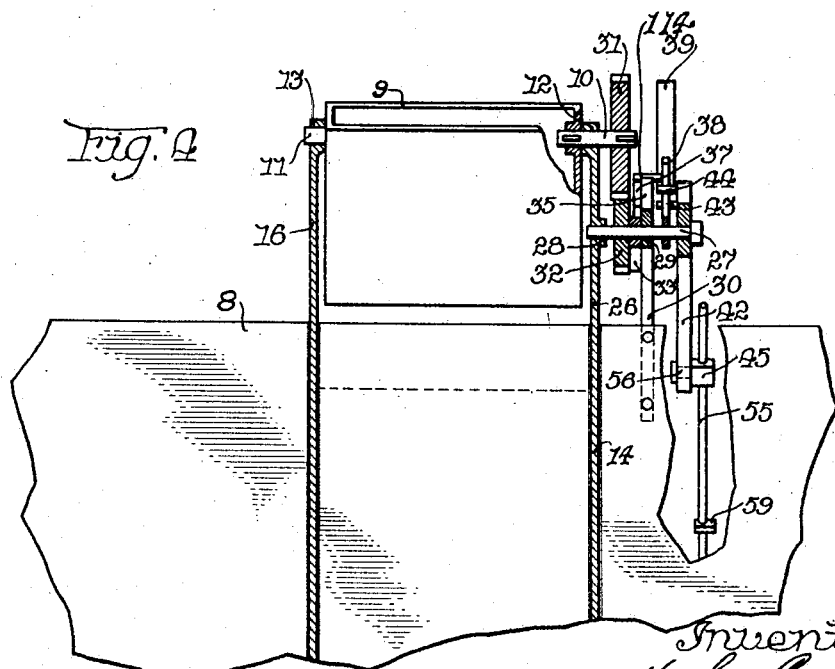

Referring to the accompanying drawings, Figure 1 shows a partly sectional plan view of one form of meter embodying my invention; Fig. 2 shows a sectional elevation on the line 2—2 of Fig. 1 looking in the direction of the arrows; Fig. 3 shows a sectional elevation on the line 3—3 of Fig. 1; while Fig. 4 shows a sectional elevation on the line 4—4 of Fig. 1.

In carrying out my invention, I preferably employ a plurality of measuring compartments or weighing compartments which may be placed side by side and in the accompanying drawings I have shown one form of construction which may be used. In the drawings, 5 represents a shell which is divided into two measuring compartments, 6 and 7, by a partition 8 disposed diametrically across the shell and extending upwardly from the bottom of the shell. The shell 5 may be closed by means of a head 112 and a valve 113 connected to the head, when open, serves to bring the space within the shell into communication with the atmosphere. Above the upper edge of the partition 8 a swinging chute 9 is mounted on trunnions 10 and 11 which are carried by bearings 12 and 13 respectively. On each side of the partition conduits or passages are formed to lead the liquid issuing from the lower end of the chute 9 to the measuring compartments. The conduits communicate with their respective measuring compartments at the lower portion so that the surface of the liquid in the measuring compartments is not disturbed by the flow of liquid. As shown in Fig. 3 conduit 14 leads to compartment 6 and conduit 15 leads to compartment 7. The bearings 12 and 13 above mentioned are supported by pieces extending from the sides of the conduits as shown more clearly in Fig. 4 where bearings 12 and 13 are shown supported by extension pieces 26 and 16 respectively.

In the preferred form of my invention which eliminates the use of a storage chamber while retaining the advantages of measuring the liquid positively, in communication with air or other fluid, it is desirable that the rate of supply of liquid to the meter be, at all times, practically the same as the rate of conveying liquid from the meter and I have provided means for automatically accomplishing this purpose in which I preferably control the rate of supply of liquid to the measuring compartments by float actuated means or by other means actuated by the liquid in proportion to the rate of flow of liquid from the meter. In the construction described below it will be seen that the aggregate amount of liquid contained in the measuring compartments increases as the rate of conveying liquid from the meter decreases and vice versa and suitable mechanism for controlling the supply is used which is actuated by the combined level of liquid or the aggregate amount of liquid contained in the measuring compartments. In the drawings I have shown two methods of control. In one method a valve in the supply line leading to the meter is used while in the other the rate of supply is controlled by the volume of the air or other fluid, above the liquid being measured. In both cases it will be seen that the rate of supply of liquid to the meter is controlled by the rate of conveying of liquid from the meter and that the two rates are practically equal. The use of a valve in the supply line, being in some respects more simple, will be described first, but I do not wish to confine myself to any specific mechanism for this purpose.

Referring to Fig. 1, a pipe 17 is adapted to supply liquid to the meter. A valve 18 in the supply line controls the rate of supply of liquid. The valve 18 is preferably of the balanced type which is easily operated and has a valve stem 20 pinned to an operating lever 19 at 21. One end of the lever 19 is pivotally connected at 23 with a link 22 extending from a pin connection 24 on the body of the valve 18; the other end of the lever 19 may be swung vertically; as the end 19 rises the valve 18 opens and as the end 19 falls the valve 18 closes. The supply pipe 17 extends through the shell 5 and terminates in a trough 25 open at its lower end at 126 and adapted to lead liquid to the swinging chute 9. The trough 25, chute 9, and conduits 15 and 14 are preferably elongated, each having its narrow dimension perpendicular to the partition 8 so that the liquid passes from the trough, through the chute into one of the conduits in a relatively thin sheet which may be quickly shifted to the opposite conduit.

A mechanism which may be used for shifting the chute 9 is shown more clearly in Figs. 2 and 4. A shaft 27 is mounted in a bearing 28 formed in extension piece 26 and in a bearing 29 carried by a bracket 30 attached to the partition 8. A gear 31 keyed to the trunnion 10 meshes with a gear 32 secured to the shaft 27 so that by oscillating the shaft 27 the chute 9 may be made to deliver liquid to either measuring compartment. A lever 33 is secured to the shaft 27 which it is adapted to oscillate thus controlling the position of the shaft 27 and the chute 9. Extending upwardly from bracket 30 on either side of the partition 8 are stationary lugs 34 and 35, while pinned to the lever 33 are two catches 36 and 37, adapted to engage the lugs 34 and 35 respectively thus holding the lever 33 in either of its extreme positions. A spring 40 presses against catch 36 causing catch 36 to engage lug 34 which holds the lever 33 in the position shown in Fig. 2 until the catch 36 is disengaged. A spring 41 presses against catch 37 and the lever 33 may be turned in a clockwise direction so as to permit catch 37 to engage lug 35 which in turn holds lever 33 until catch 37 is disengaged. An arm 38 carrying a weight 39 is loosely mounted on the shaft 27 and a pin 114 secured to arm 38 extends over lugs 34 and 35 and is adapted to strike the catches 36 and 37 as the arm 38 swings upon shaft 27. A lever 42 loosely mounted upon shaft 27 carries two pins 43 and 44, Fig. 4, which are on opposite sides of arm 38. Referring to Fig. 2, as lever 42 swings in a clockwise direction the pin 43 strikes arm 38 and swings the arm with weight 39 until the arm passes through a vertical position where the weight 39 causes the arm 38 to fall to the right and the pin 114 strikes catch 36 disengaging the catch from the lug 34 and swinging lever 33 in a clockwise direction, shifting chute 9 so that it directs liquid to measuring compartment 6, while catch 37 engages lug 35 holding lever 33 from movement in the opposite direction until released. As lever 42 swings in a counter clockwise direction the pin 44 strikes arm 38 and swings the arm with weight 39 until the arm passes through a vertical position when weight 39 causes arm 38 to fall to the left. The pin 114 strikes catch 37 disengaging the catch from the lug 35, swinging lever 33 in a counter clockwise direction and shifting chute 9 so that it directs liquid to compartment 7, while catch 36 engages lug 34 as shown in Fig. 2.

The shifting mechanism should be operated either when the proper amount of liquid is received in a measuring compartment or when the proper amount of liquid has been conveyed from the measuring compartment and as shown in the accompanying drawings this may be conveniently done by means of floats actuated by the level of the liquid within the measuring compartments. In the drawings these floats are shown as causing the shifting mechanism to act when the liquid reaches a predetermined high level near the top of each measuring compartment; the floats may however be arranged so as to cause the shifting mechanism to act when the liquid reaches a predetermined low level near the bottom of each measuring compartment. Referring particularly to Fig. 2, a float rod 46 pivotally supported by a bracket 48 on partition 8 extends into compartment 6 and a float rod 47 pivotally supported by a bracket 49 on partition 8 extends into compartment 7. The float rods 46 and 47 carry floats 50 and 51 respectively which are actuated by the level of liquid in the corresponding measuring compartment. A rod 55 is pivotally connected to float rod 47 at 53. The opposite end of rod 55 is slidingly received in a swivel block 45 at one end of lever 42 and the rod 55 carries a collar 59 which is adapted to strike the block 45. As the level of liquid in compartment 7 rises the float 51 rises and rod 55 slides upwardly through block 45 until collar 59 strikes the block which turns lever 42 in a clockwise direction. See particularly Figs. 2 and 4. Similarly a rod 54 is pivotally connected to float rod 46 at 52 and the opposite end of the rod 54 is slidingly received in a swivel block (not shown) at the other end of lever 42 while a collar 58 on rod 54 is adapted to strike the last mentioned block. As the level of liquid in compartment 6 rises the float 50 rises and rod 54 slides upwardly until collar 58 strikes the block just mentioned which turns lever 42 in a counter clockwise direction.

As shown in Fig. 2 the measured liquid may be conveyed from the measuring compartments by means of a manifold pipe 69—69 terminating in an outlet flange 57. A valve 60 having valve disks 66 and 68 mounted on a valve stem 62 and adapted to seat on the body of valve 60 controls the passage of liquid from compartment 6 to the manifold and a valve 61 having valve disks 65 and 67 mounted on a valve stem 63 and adapted to seat on the body of valve 61 controls the passage of liquid from compartment 7. The valves open as the valve disks are raised by an upward movement of their respective valve stems and the liquid passes through ports under the valve disks into the manifold pipe 69—69. In Fig. 2 valve 60 is in its open position showing the ports at 68—68. The upper ends of the valve rods are pivotally connected to opposite ends of lever 33 which controls the opening and closing of the valves as will be more fully described.

Near the top of the shell 5 there is an extension case 115 in which is rotatably mounted a shaft 75. One end of the shaft extends through the case and a lever 76 is secured to the shaft outside of the case. A lever 73 is secured to shaft 75 inside the case and extends into the shell, through a slot 116 as shown in Fig. 2, to a point near the middle of the shell. A lever 72 is pivotally mounted at its middle on the extending end of lever 73, and rods 70 and 71 loosely pinned at either end of the lever 72 extend downwardly and are pinned to float rods 46 and 47 respectively as shown in Fig. 2. Lever 76 on the outside of case 115 may be operatively connected to lever 19 by means of a link 77 and it will be evident that the operation of valve 18 will depend upon the combined action of the two floats 50 and 51 which will depend upon the aggregate amount of liquid contained in the two measuring compartments 6 and 7. If the level of the liquid in compartment 6 rises, float 50 will rise lifting rod 70 which by lifting on the end of lever 72 will tend to raise lever 73, or if the liquid in compartment 7 rises, float 51 will rise lifting rod 71 which by lifting on the other end of lever 72 will tend to raise lever 73 and vice versa, while if one of the floats rises at the same rate that the other float falls, the lever 72 will simply turn about its middle and lever 73 will not move. If, however, either of the floats 50 or 51 rises at a more rapid rate than the other float falls the lever 73 will swing upwardly, lever 76 will swing downwardly moving link 77 downwardly and closing valve 18; if either of the floats falls at a more rapid rate than the other float rises, lever 73 will swing downwardly and lever 76 will swing upwardly opening valve 18.

From the description which follows it will be evident that the arm 76 assumes different positions depending upon the rate of flow from the meter which controls valve 18 so that the rate of flow to the meter is substantially equal to the rate of flow from the meter and a pointer 129 carried by arm 76 and adapted to indicate upon a suitable scale 128 supported from pipe 17 may be arranged to indicate the rate of flow of liquid through the meter as subsequently described.

As before mentioned other methods may be employed for controlling the rate of supply of liquid to the meter and one other method consists in maintaining the proper supply of air or other fluid above the liquid being measured. For this purpose the valve 113 should be closed, maintaining the shell tight. When operated under vacuum or pressure less than atmospheric pressure it may be necessary to supply a small amount of air to the meter which may be done by hand through valve 113 or automatically by means of the proper arrangement of a relief valve which will be later described. When operated under pressure greater than atmospheric pressure an air compressor may be used to supply air to the meter while a relief valve may be used to release excess air from the meter. The relief valve is shown at 80 in a pipe line 81 which leads from the upper portion of the shell 5. The valve 80 is operated by an arm 79 connected by a slotted link 78 to lever 76. In operating the meter under pressure, when the aggregate amount of liquid in the measuring compartments is great the valve 80 is held closed; when the aggregate amount decreases to the desired amount the lever 76 swings upwardly as previously described opening valve 80 which allows air to escape from the meter as will be more fully described. In operating the meter under vacuum, the valve 80 is connected so that it is opened when the aggregate amount of liquid increases thus allowing air to pass from the atmosphere into the meter shell. The air compressor shown at 82, is of the steam driven type. When in operation air passes into the compressor at 83 where it is brought to the desired pressure and then delivered through pipes 85 and 84 to the meter. A steam line 86 supplies steam for operating the compressor and the exhaust steam passes from the compressor from pipe 95; a valve 189 may be used to shut off the supply of steam when not in use. A control valve 88 in steam line 86 may be used to automatically control the supply of steam to operate the compressor. The valve 88 has a stem 90 pivotally connected at its upper end to one end of a lever 89 which is pivotally supported at a point near its middle by a link 91 extending from the body of the valve 88. An upward movement of the end 94 of lever 89 closes valve 88 while a downward movement of end 94 of lever 89 opens the valve 88. A link 92 having one end pivotally connected to lever 76 is adapted to connect at its other end, 93, with lever 89 at 94, when it is desired to operate the compressor automatically as hereinafter more fully described.

As before mentioned the meter may be made to indicate the amount of liquid by indicating the rate of flow, by recording the rate of flow or by registering the flow or the total amount of liquid which has passed through the meter. Such mechanism may be operated by arm 76 as previously pointed out or it may be operated directly from the action of the liquid in each measuring compartment. This will be more fully understood by referring to Figs. 1 and 3 where 96 represents any preferred form of register such as a counter which may be calibrated to read in pounds or gallons. The register 96 is operated by a shaft 97 extending from the register into the shell and supported by bearings 98 and 99. Secured to the shaft 97 are two ratchet wheels 104 and 105 either of which when rotated in a forward direction will rotate shaft 97 and operate the register. On the shaft 97, above compartment 6 is rotatably mounted a sheave 100 carrying a cable 106. A float 108 actuated by the level of liquid in compartment 6 is attached to one end of the cable while a weight 110 suspended from the other end of the cable holds the cable tight over the sheave. A spring pressed pawl 102 carried by sheave 100 is adapted to engage ratchet wheel 104. As the level of liquid in compartment 6 falls, float 108 falls turning sheave 100 and pawl 102 engages ratchet wheel 104 which is rotated in a forward direction with the sheave, thus operating register 96; as the level of liquid in compartment 6 rises, the weight 110 pulling downwardly upon the other end of cable 106 turns sheave 100 in the opposite direction without rotating the ratchet wheel 100 upon which the pawl 102 slips when the sheave is operated in a backward direction. In a similar manner a sheave 101 is mounted on shaft 97 above compartment 7 and carries a cable 107 at one end of which is attached a float 109 which is actuated by the level of liquid in compartment 7, while at the other end of the cable is suspended a weight 111. Sheave 101 carries a spring pressed pawl 103 adapted to engage ratchet wheel 105 which rotates shaft 97 in a forward direction as the float 109 falls; as the float 109 rises the weight 111 turns sheave 101 in the opposite direction without rotating the ratchet wheel 101 upon which the pawl 103 slips.

Secured to the shaft 97 and rotated therewith is a gear 116 which meshes with a gear 117 secured to a shaft 118 rotatably mounted in a bearing 119 supported by bearing 99 and a bearing 120 supported by the shell 5. The shaft 118 extends through the shell and connects with a flexible shaft 121 which is adapted to transmit motion to a suitable tachometer or speed indicator. Any form of indicating or recording tachometer which is constructed so as to indicate speed of rotation upon a scale, or of recording the speed upon a chart may be used. In the drawings 122 represents a tachometer having a recording pen 123 adapted to record the speed of rotation by drawing a line as shown at 124 upon a chart 125 which may be driven by clockwork within the tachometer. By properly proportioning the parts of the tachometer and the gears of the meter which drive it through the flexible shaft 121 the device may be made to record the rate of flow of liquid through the meter as will be evident from the description of the operation of the meter. A pointer 127 carried by pen 123 may be arranged to indicate the rate of flow of liquid through the meter upon a suitable scale as shown at 136.

The operation of the meter is as follows: Suppose that the liquid levels and various parts of the meter are in the positions shown in the drawings with the link 77 connected as shown so as to operate valve 18, then liquid supplied through valve 18, pipe 17 and trough 25, will be delivered through chute 9 and conduit 15 into measuring compartment 7; valve 60 will be open and liquid will be conveyed from measuring compartment 6 through manifold 69 and will be conveyed from the meter through outlet flange 57 for the purpose desired. The float 51 will rise due to rise of the level of liquid in compartment 7 while float 50 will fall due to the fall of the level of liquid in compartment 6. If the rate at which liquid is conveyed from compartment 6 is the same as the rate of supply of liquid to compartment 7 float 51 will rise at the same rate that float 50 falls, lever 73 will remain stationary and the rate of supply will not be changed; if more liquid is needed and taken from the outlet 57 the rate of conveying liquid from compartment 6 will increase and float 50 will fall at a greater rate than float 51 rises, lever 73 will swing downwardly opening valve 18 until the rate of supplying liquid to compartment 7 equals the rate that liquid is conveyed from compartment 6; if less liquid is used from outlet 57 the rate of conveying liquid from compartment 6 will decrease and float 51 will rise at a greater rate than float 50 falls, lever 73 will swing upwardly closing valve 18 until the rate of supplying liquid to compartment 7 equals the rate that liquid is conveyed from compartment 6. It will be seen that the total amount of air or fluid with respect to the total amount of liquid in the measuring compartments is thus controlled. Further, as the level of liquid in compartment 7 rises rod 55 slides upwardly until collar 59 strikes the swivel block 45 at the end of lever 42 when further rise of the float turns lever 42 in a clockwise direction (referring to Fig. 2), pin 43 strikes arm 38 swinging said arm with weight 39 clockwise. The parts may be so proportioned that when compartment 7 is filled to the desired level or when the liquid in compartment 7 reaches a level just below the top of partition 8, which should be while the level in compartment 6 is still above the valve 60, the arm 38 with weight 39 will pass its vertical position and by virtue of the weight will swing downwardly to the right. Pin 114 will then strike catch 36 disengaging it from lug 34 and lever 33 will turn rapidly in a clockwise direction swinging chute 9 so that it delivers liquid to compartment 6, opening valve 61 and closing valve 60 until valve disks 64 and 66 reach their seats. The shifting of the valves and chute takes place almost instantly and the liquid is then supplied to compartment 6 and conveyed from compartment 7 in a similar manner, and with similar control of supply as above described. As the level of the liquid in compartment 6 rises, rod 54 slides upwardly until collar 58 strikes the swivel block at the other end of lever 42, when the lever is turned in a counter clockwise direction, and pin 44 strikes arm 38 swinging the arm with weight 39 in a counter clockwise direction. When compartment 6 is filled to the desired level or when the liquid reaches a level just below the top of partition 8, the arm with weight 39 will swing downwardly to the left, pin 114 will strike catch 37, disengaging it from lug 35 and lever 33 will turn rapidly in a counter clockwise direction swinging chute 9 so that it will supply liquid to compartment 7 closing valve 61 and opening valve 60 thus completing the cycle of operation and delivering liquid from the meter in a practically uninterrupted stream.

From the above it will be seen that the lever 76 assumes various positions depending upon the rate of flow of liquid from the meter. The measuring compartments will be filled and emptied and will deliver liquid from the meter in charges which will vary in amount under varying conditions in the rate of flow of liquid to or from the meter. As the rate of flow increases the aggregate amount of liquid in the measuring compartments decreases, and lever 73 swings downwardly while lever 76 swings upwardly and vice versa so that the scale 128 may be calibrated to show the rate at which liquid is passing through the meter.

As previously mentioned the shaft 97 is operated by a downward movement of either of the floats 108 or 109 and it will be evident that as liquid is being supplied to and conveyed from the meter at substantially the same rate and as the shifting of the chute and valves is almost instantaneous the shaft 97 will receive motion from the action of either float 108 or 109 and the rotation of the shaft will be substantially continuous while the speed of the shaft 97 will at all times be in proportion to the rate of flow of liquid from the meter. It will be evident therefore that motion will be imparted to the register substantially continuously and that register 96 will be operated in proportion to the amount of liquid conveyed from the meter and that the register may be calibrated to register the amount in any units desired. As the register is operated substantially continuously in proportion to the amount of liquid conveyed from the meter, the register will show at any time the amount of liquid conveyed from the meter. Further, the shaft 97 having a substantially continuous movement while liquid is being measured furnishes a means by connection with the flexible shaft 121 for operating a suitable indicating or recording tachometer (a combined instrument being shown at 122) which may be calibrated to indicate or record the rate of flow of liquid through the meter.

When it is desired to measure liquid under vacuum as for example in measuring water of condensation from a heating system as it passes to a vacuum pump, the meter should be installed in the line between the heating system and the pump. Valve 18 may be omitted together with lever 19 and link 77, valve 113 should be closed and valve 80 should be operatively connected to lever 76 by means of link 78 and should be set so that it opens when lever 76 swings downwardly due to rise of the combined liquid levels within the compartments 6 and 7 and closes with the opposite movement. As the combined levels of liquid increase due to air being taken up by the water the valve 80 will be opened and allow admission of air to the meter until the combined levels fall and the supply to the meter will therefore be controlled by the action of the floats 50 and 51 which are in turn controlled by the aggregate amount of liquid in the compartments and by the rate at which liquid is conveyed from the meter.

When the meter is operated under pressure as for example when water is pumped to the meter and conveyed from the meter under pressure to a boiler, the valve 18 with connecting link 77 may be omitted while the air compressor 82 may be used to supply air or other suitable fluid to the meter. The valve 113 should be closed, and valve 80 should be arranged to open as lever 76 rises due to a fall of the combined liquid levels in the compartments 6 and 7 and vice versa. The end 94 of lever 89 should be connected by a pin joint to the end 93 of lever 92. The water may then be pumped to the meter under pressure and as the aggregate amount of liquid in the compartments decreases due to expansion of the air which may be caused by a reduction in pressure, the valve 80 will open allowing the escape of air from the meter whereupon more water will be supplied and the amount of liquid will increase, closing valve 80. The link 78 which operates valve 80 may be slotted as shown which will allow a slight change in position of lever 76 without operating the valve while a pronounced change due to considerable change in the aggregate amount of liquid in the measuring compartments will operate the valve. As the aggregate amount of liquid increases due to compression of air within the meter, the valve 88 will be opened as previously described causing the compressor 82 to operate, which will deliver air to the meter, thereby decreasing the aggregate amount of liquid in the meter.

Under the various conditions of operation it will therefore be seen that the rate of supply of liquid to the meter is automatically controlled by the rate at which liquid is conveyed from the meter or by the aggregate amount of liquid contained in the meter and that while liquid is measured in charges which may vary in amount, the indicating mechanism is operated in proportion to the amount of liquid conveyed from the meter.

It is obvious that other forms of construction embodying my invention may be devised and I do not wish to limit myself to the forms described.

What I claim as my invention and desire to protect by Letters Patent is:

1. A liquid meter comprising a plurality of measuring compartments, means for supplying liquid to and means for conveying liquid from the measuring compartments successively whereby each of the measuring compartments is filled and emptied, means for indicating the rate of flow of liquid through the meter and means actuated by the aggregate amount of liquid in the compartments for operating the indicating means.

2. A liquid meter comprising two measuring compartments, means for supplying liquid to and means for conveying liquid from the measuring compartments alternately whereby each of the measuring compartments is filled and emptied, means for indicating the rate of flow of liquid through the meter and means actuated by the aggregate amount of liquid in the compartments for operating the indicating means.

3. In a liquid meter, a measuring compartment adapted to fill with liquid and to deliver liquid in charges which may vary in amount under varying conditions in the rate of flow of liquid from the meter, means for registering the flow of liquid through the meter and means actuated by the liquid in the measuring compartment for operating the registering means in proportion to the amount of liquid delivered by the measuring compartment.

4. In a liquid meter, a measuring compartment adapted to fill with liquid and to deliver liquid in charges which may vary in amount under varying conditions in the rate of flow of liquid from the meter, means for indicating the flow of liquid through the meter and means actuated by the liquid in the measuring compartment for operating the indicating means in proportion to the rate of flow of liquid from the meter.

5. A liquid meter comprising a pair of measuring compartments, means for supplying liquid to and means for conveying liquid from the measuring compartments alternately whereby each of the measuring compartments is filled and emptied, means for controlling the rate of supply of liquid to the measuring compartments, a pair of floats each actuated by the amount of liquid in one of the measuring compartments and means for operatively connecting the floats and the controlling means.

6. A liquid meter comprising a pair of measuring compartments, means for supplying liquid to and means for conveying liquid from the measuring compartments alternately whereby each of the measuring compartments is filled and emptied, means for controlling the rate of supply of liquid to the measuring compartments, a pair of floats each actuated by the level of the liquid in one of the measuring compartments and means for operatively connecting the floats and the controlling means.

7. A liquid meter comprising a plurality of measuring compartments, means for supplying liquid thereto, means for conveying liquid therefrom, means for indicating the flow of liquid through the meter, means for controlling the rate of supply of liquid to the measuring compartments and means actuated by the amount of liquid in each of the measuring compartments for operating the indicating and the controlling means.

8. In a liquid meter having a measuring compartment adapted to measure liquid, means for supplying liquid thereto, means for conveying liquid therefrom, means for controlling the rate of supply of liquid to the measuring compartment, means for indicating the flow of liquid through the meter and means actuated by the amount of liquid in the measuring compartment for operating the controlling and indicating means.

9. A liquid meter comprising a plurality of measuring compartments adapted to receive liquid successively, means for supplying liquid to the measuring compartments, means for controlling the rate of supply of said liquid, means actuated by the level of liquid in each compartment for shifting the supply of liquid to the measuring compartments successively and for operating the controlling means and means for conveying liquid from the measuring compartments.

10. A liquid meter comprising a plurality of measuring compartments each adapted to alternately fill with liquid being measured and with other fluid adapted to displace said liquid, means for supplying liquid to the measuring compartments successively, means for conveying liquid from the measuring compartments, means forming communication between the measuring compartments whereby the fluid may pass from one measuring compartment to another and means actuated by the liquid in the measuring compartments for controlling the total amount of fluid with respect to the total amount of liquid within the measuring compartments.

11. A liquid meter comprising a shell, means for dividing the lower portion of the shell into measuring compartments adapted to alternately fill with liquid being measured and with other fluid adapted to displace said liquid, the upper portion of said shell forming communication between the measuring compartments whereby the fluid may pass from one measuring compartment to another, means for supplying liquid to the measuring compartments successively, means for conveying liquid from the measuring compartments and means actuated by the aggregate amount of liquid in the measuring compartments for controlling the relative amount of fluid and liquid within the measuring compartments.

12. A liquid meter comprising a pair of measuring compartments, means for supplying liquid to and means for conveying liquid from the measuring compartments alternately whereby each of the measuring compartments is filled and emptied, means for controlling the rate of supply of liquid to the meter and a pair of floats each actuated by the amount of liquid in one of the measuring compartments for operating the controlling means whereby liquid is supplied to the meter at substantially the same rate that liquid is conveyed from the meter.

13. A liquid meter comprising a plurality of measuring compartments, means for supplying liquid to and means for conveying liquid from the measuring compartments successively whereby each of the measuring compartments is filled and emptied, means for controlling the supply of liquid to the meter and means actuated by the liquid and in proportion to the amount of liquid in the measuring compartments for operating the controlling means whereby liquid is supplied to the meter at substantially the same rate that liquid is conveyed from the meter.

14. A liquid meter comprising a plurality of measuring compartments, means for supplying liquid thereto, means for conveying liquid therefrom, means for indicating the rate of flow of liquid through the meter and means actuated by the aggregate amount of liquid in the measuring compartments for operating the indicating means.

15. A liquid meter comprising a plurality of measuring compartments, means for supplying liquid thereto, means for conveying liquid therefrom, means for controlling the rate of supply of liquid to the measuring compartments, means for indicating the rate of flow of liquid through the meter and means actuated by the aggregate amount of liquid in the measuring compartments for operating the controlling and indicating means.

16. A liquid meter comprising a plurality of measuring compartments, means for supplying liquid to and means for conveying liquid from the measuring compartments successively whereby each of the measuring compartments is filled and emptied, means for controlling the supply of liquid to the meter and means actuated by the liquid in proportion to the rate of flow of liquid from the meter for operating the controlling means whereby the rate of flow to the meter is maintained substantially equal to the rate of flow from the meter.

17. A liquid meter comprising a plurality of measuring compartments, means for supplying liquid to the meter, means for directing the liquid to the compartments successively, means for conveying liquid from the compartments, means for controlling the rate of supply of liquid to the meter and means actuated by the liquid for operating the directing and the controlling means.

18. A liquid meter comprising a pair of measuring compartments, means for supplying liquid to and means for conveying liquid from each of the compartments alternately whereby each of the compartments is filled and emptied, means for controlling the rate of supply of liquid to the compartments, a pair of members each actuated by the amount of liquid in one of the compartments and means operatively connecting said members with the controlling means.

19. A liquid meter comprising a pair of measuring compartments, means for supplying liquid to and means for conveying liquid from each of the compartments alternately whereby each of the compartments is filled and emptied, a valve for controlling the rate of supply of liquid to the compartments, a swinging lever adapted to operate the valve, a second lever pivotally mounted on the swinging lever and a pair of members each actuated by the amount of liquid in one of the compartments and operatively connected to the second lever whereby the combined action of said members is transmitted to the controlling valve.

20. In a liquid meter comprising a measuring compartment adapted to receive liquid and to deliver liquid in charges which may vary in amount under varying conditions in the rate of flow of liquid from the meter, means for registering the flow of liquid through the meter and means actuated by the change of level of liquid in the compartment for operating the registering means in proportion to the amount of liquid delivered by the measuring compartment.

21. In a liquid meter comprising a plurality of measuring compartments adapted to successively receive and deliver liquid in charges which may vary in amount under varying conditions in the rate of flow of liquid from the meter, means for registering the flow of liquid through the meter and means actuated by the liquid in at least one of said measuring compartments for operating the registering means in proportion to the amount of liquid delivered by the measuring compartments.

In testimony whereof I have affixed my signature in the presence of two subscribing witnesses.

HARLEY C. ALGER.

Witnesses:
H. F. SPELMAN,
EMMA ALGER.